US012621376B2

(12) United States Patent
Kuo

(10) Patent No.: US 12,621,376 B2
(45) Date of Patent: May 5, 2026

(54) METHOD FOR MANAGING INFORMATION OF FIELD REPLACEABLE UNITS

(71) Applicant: Mitac Computing Technology Corporation, Taoyuan City (TW)

(72) Inventor: Ming-I Kuo, Taoyuan City (TW)

(73) Assignee: Mitac Computing Technology Corporation, Taoyuan City (TW)

( * ) Notice: Subject to any disclaimer, the term of this patent is extended or adjusted under 35 U.S.C. 154(b) by 62 days.

(21) Appl. No.: 18/948,086

(22) Filed: Nov. 14, 2024

(65) Prior Publication Data

US 2025/0310428 A1      Oct. 2, 2025

(30) Foreign Application Priority Data

Apr. 2, 2024    (TW) ................................. 113112479

(51) Int. Cl.
*H04L 69/22* (2022.01)

(52) U.S. Cl.
CPC .................................... *H04L 69/22* (2013.01)

(58) Field of Classification Search
CPC .. G06F 11/30; G06F 11/3006; G06F 11/3031; G06F 11/3055; G06F 11/3058; G06F 13/4282; G06F 21/572; G06F 2213/0026; G06F 3/067; G06F 8/65; G06F 9/4401; G06F 9/4411; G06F 9/44505; G06F 9/542; H04L 41/0213; H04L 41/04; H04L 41/0806; H04L 41/0853; H04L 41/0886; H04L 41/12; H04L 41/344; H04L 43/0817; H04L 43/10; H04L 67/1097; H04L 67/125; H04L 69/22; H05K 7/1492; H05K 7/1498
See application file for complete search history.

(56) References Cited

U.S. PATENT DOCUMENTS

| | | | |
|---|---|---|---|
| 7,571,222 B1 * | 8/2009 | Evans ..................... | H04L 41/12 709/223 |
| 2007/0073800 A1 * | 3/2007 | Rothman .............. | H04L 41/082 709/202 |
| 2015/0178095 A1 * | 6/2015 | Balakrishnan ........ | G06F 13/364 710/110 |

(Continued)

FOREIGN PATENT DOCUMENTS

| | | | | |
|---|---|---|---|---|
| EP | 3416466 A1 * | 12/2018 | ........... | H05K 7/1498 |

*Primary Examiner* — Christopher Biagini
(74) *Attorney, Agent, or Firm* — MLO, a professional corp.

(57) ABSTRACT

A method for managing information of FRUs is implemented by a BMC that connects to multiple electronic devices and a user-end device. The method includes: sending a query to each electronic device requesting information datasets therefrom, each of which includes header information; for each information dataset, when determining that the electronic device corresponding to the information dataset is an FRU based on the header information, generating an identification code that corresponds to the information dataset, and storing the information dataset and the identification code; when receiving, from the user-end device, an OEM command requesting for all identification codes, sending the identification codes to the user-end device; and when receiving a command set that includes one of the identification codes stored in the BMC, sending the information dataset that corresponds to the one of the identification codes to the user-end device.

18 Claims, 3 Drawing Sheets

(56) References Cited

U.S. PATENT DOCUMENTS

| | | | | |
|---|---|---|---|---|
| 2015/0381769 | A1* | 12/2015 | Yeh | H04L 67/10 |
| | | | | 709/223 |
| 2018/0336324 | A1* | 11/2018 | Kodama | H04L 63/083 |
| 2022/0182286 | A1* | 6/2022 | Huang | G06F 21/45 |
| 2023/0237473 | A1* | 7/2023 | Suchindran | G06Q 20/3827 |
| | | | | 705/64 |

* cited by examiner

METHOD FOR MANAGING INFORMATION OF FIELD REPLACEABLE UNITS

CROSS-REFERENCE TO RELATED APPLICATION

This application claims priority to Taiwanese Invention patent application No. 113112479, filed on Apr. 2, 2024, the entire disclosure of which is incorporated by reference herein.

FIELD

The disclosure relates to a method for managing information, and more particularly to a method for managing information of field replaceable units.

BACKGROUND

Field replaceable unit (FRU) refers to a component of a server that may be replaced on-site when a portion of the component is damaged or requires repair. Such a design can reduce repair costs and time, thereby making server repair more efficient and convenient.

The physical memory of the FRU may store information of the FRU, including product name, product serial number, production date, hardware version number, etc. As such, a maintenance personnel may use the information to troubleshoot and repair the FRU.

However, when there are multiple FRUs to be repaired, the information of each of the FRUs needs to be obtained according to a method provided by the original manufacturer of that FRU, which usually requires the maintenance personnel to look up various tables provided by the original manufacturers of the FRUs to know what kind of FRUs are in the server and what software tools should be used for repairing the FRUs, respectively. The maintenance personnel needs to be next to the server to obtain the information of each of the FRUs using the software tools. That is to say, the maintenance personnel is unable to obtain the information of each of the FRUs remotely. Moreover, if a user of the server inserts or removes certain FRUs in the server and thereby changes the original configuration of the server, the maintenance personnel may not know the latest configuration of the server and may thus be unable to manage maintenance operation remotely.

SUMMARY

Therefore, an object of the disclosure is to provide a method for managing information of FRUs that can alleviate at least one of the drawbacks of the prior art.

According to an aspect of the disclosure, a method for managing information of FRUs is to be implemented by a baseboard management controller (BMC), the BMC is electrically connected to a plurality of electronic devices and is connected to a user-end device through a communication network. The method includes steps: A) sending a query to each of the electronic devices requesting information datasets respectively from the electronic devices, where each of the information datasets includes header information; B) for each of the information datasets received from the electronic devices, determining whether the electronic device that corresponds to the information dataset is an FRU based on the header information included in the information dataset, and in response to determining that the electronic device corresponding to the information dataset is an FRU, generating an identification code that corresponds to the information dataset and that conforms to specifications of Intelligent Platform Management Interface (IPMI), and storing the information dataset and the identification code, wherein the identification code generated for each of the information datasets received from the electronic devices is unique; C) in response to receiving, from the user-end device, an Original Equipment Manufacturer (OEM) command requesting for all identification codes that correspond respectively to the electronic devices determined to be an FRU, sending the identification codes stored in the BMC to the user-end device; and D) in response to receiving a command set that includes one of the identification codes stored in the BMC, sending the information dataset that corresponds to said one of the identification codes to the user-end device.

According to another aspect of the disclosure, a method for managing information of FRUs is to be implemented by a host system, the host system includes a plurality of nodes, each of which includes a baseboard management controller (BMC) and a plurality of electronic devices that are connected to the BMC, the BMC is connected to a user-end device through a communication network, the method comprising steps of, by the BMC of each of the nodes: A) sending a query to each of the electronic devices of the node requesting information datasets respectively from the electronic devices, where each of the information datasets includes header information; B) for each of the information datasets received from the electronic devices of the node, determining whether the electronic device that corresponds to the information dataset is an FRU based on the header information included in the information dataset, and in response to determining that the electronic device corresponding to the information dataset is an FRU, generating an identification code that corresponds to the information dataset and that conforms to specifications of Intelligent Platform Management Interface (IPMI), and storing the information dataset and the identification code, wherein the identification code generated for each of the information datasets received from the electronic devices of the node is unique; C) in response to receiving, from the user-end device, an Original Equipment Manufacturer (OEM) command requesting for all identification codes that correspond respectively to the electronic devices of the node determined to be an FRU, sending the identification codes stored in the BMC of the node to the user-end device; and D) in response to receiving a command set that includes one of the identification codes stored in the BMC of the node, sending the information dataset that corresponds to said one of the identification codes to the user-end device.

According to yet another aspect of the disclosure, a host system includes a plurality of nodes, each of which includes a baseboard management controller (BMC) and a plurality of electronic devices. The BMC is configured to be connected to a user-end device through a communication network. The electronic devices are connected to the BMC. The BMC of each of the nodes is configured to send a query to each of the electronic devices of the node requesting information datasets respectively from the electronic devices, where each of the information datasets includes header information. The BMC of each of the nodes is further configured to, for each of the information datasets received from the electronic devices of the node, determine whether the electronic device that corresponds to the information dataset is an FRU based on the header information included in the information dataset, and in response to determining that the electronic device corresponding to the information dataset is an FRU, generate an identification code that corresponds to the information dataset and that conforms to specifications of Intelligent Platform Management Interface (IPMI), and store the information dataset and the identification code. The identification code generated for each of the information datasets received from the electronic devices of the node is unique. The BMC of each of the nodes is further configured to, in response to receiving, from the user-end device, an Original Equipment Manufacturer (OEM) command requesting for all identification codes that correspond respectively to the electronic devices of the node determined to be an FRU, send the identification codes stored in the BMC of the node to the user-end device, and in response to receiving a command set that includes one of the identification codes stored in the BMC of the node, send the information dataset that corresponds to said one of the identification codes to the user-end device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
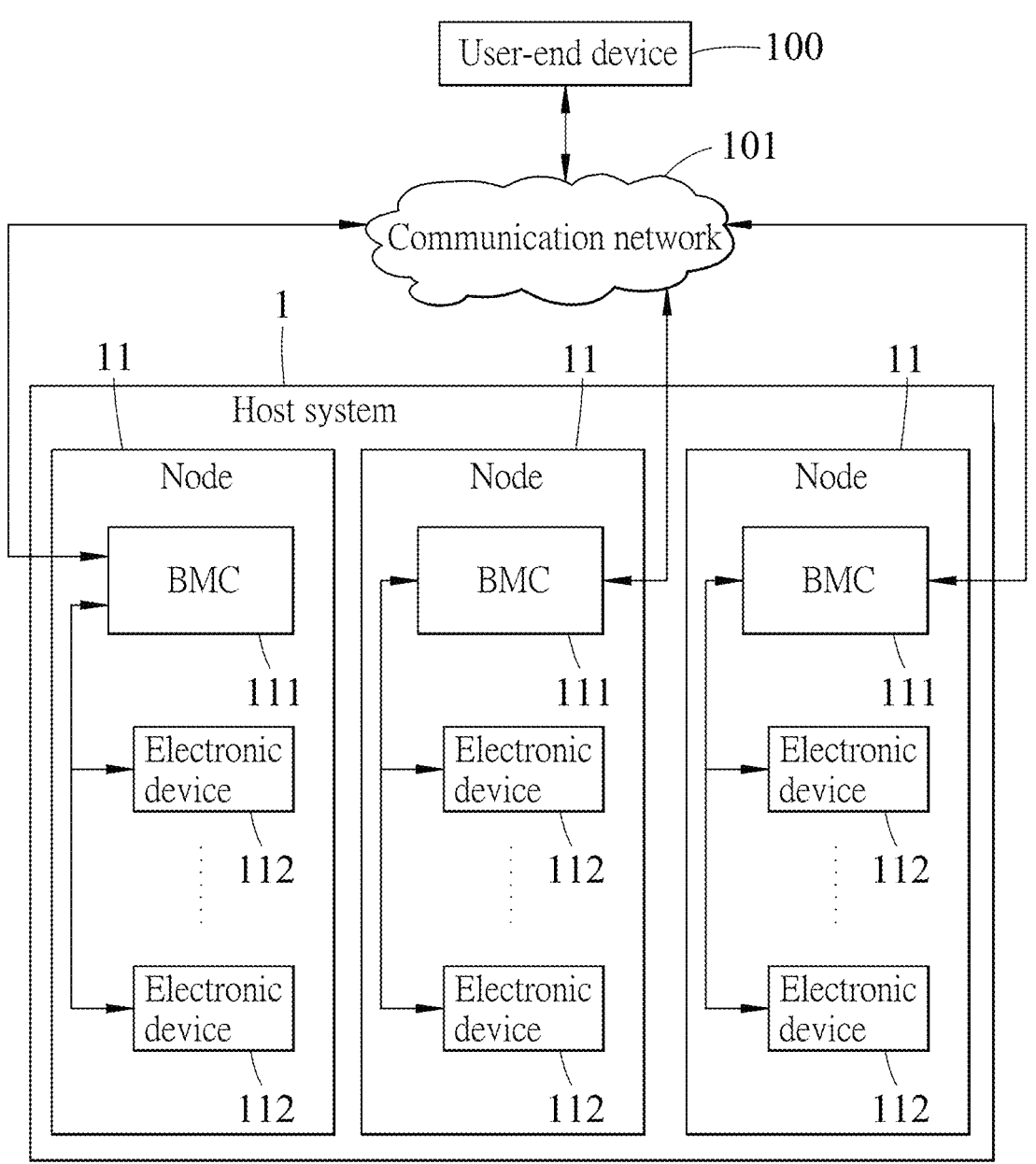
FIG. 1 is a block diagram illustrating a host system and a user-end device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a host system 1 and a user-end device 100 for implementing a method for managing information of field replaceable units (FRUs) according to an embodiment of the disclosure is provided. The host system 1 includes a plurality of nodes 11, each of which includes a baseboard management controller (BMC) 111 that is electrically connected to the user-end device 100 through a communication network 101, and a plurality of electronic devices 112 that are electrically connected to the BMC 111.

In this embodiment: the host system 1 may be, for example, a server; the communication network 101 may be, for example, the Internet; the user-end device 100 may be, for example, a personal computer; each of the electronic devices 112 may be, for example, a temperature sensor, a fan controller, a voltage and current sensor, or an FRU; and the FRU may be, for example, a main board, a network card, a video graphics array (VGA) card, and a memory card. It should be noted that the electronic devices 112 are electrically connected to the BMC 111 through an inter-integrated circuit (I2C) bus.

In one embodiment of the disclosure, the method includes a first procedure for the BMC 111 to obtain information of FRUs of the host system 1, and a second procedure for the user-end device 100 to obtain the information of FRUs of the host system 1.

Figure 2:
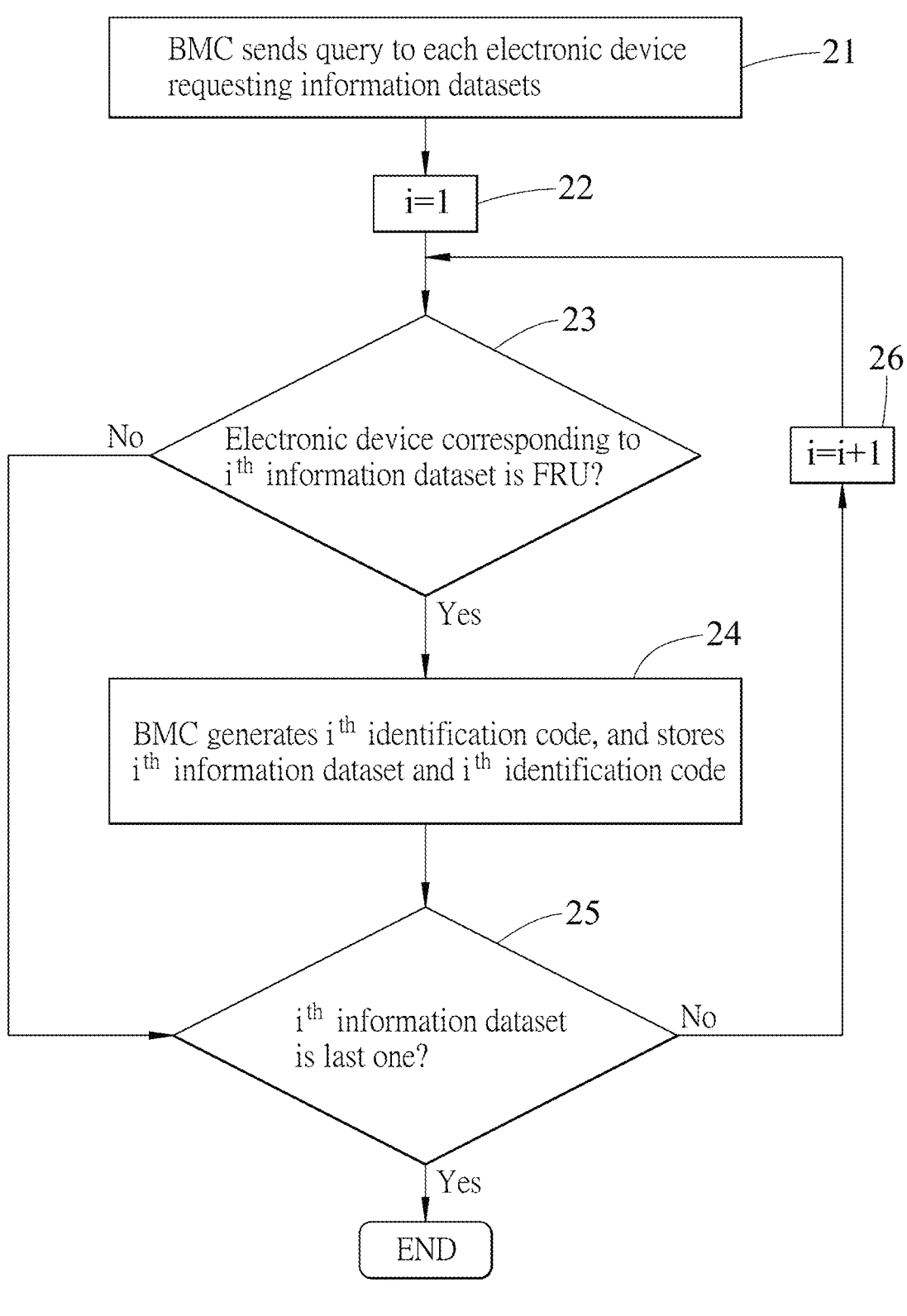
FIG. 2 is a flow chart illustrating a first procedure of a method for managing information of FRUs according to an embodiment of the disclosure.

Referring further to FIG. 2, according to an embodiment of the disclosure, a flow of the first procedure includes steps 21 to 26. It should be noted that the first procedure is performed by the BMC 111 of each of the nodes 11, and only the BMC 111 of one of the nodes 11 is described in the following for simplicity.

In step 21, the BMC 111 sends a query to each of the electronic devices 112 of the node 11 requesting information datasets respectively from the electronic devices 112 of the node 11, where each of the information datasets includes header information and address information. Specifically, the address information may be an I$^2$C bus and a slave address of the electronic device 112, and may be used by the host system 1 to communicate with the electronic device 112.

In step 22, the BMC 111 assigns an initial value to a controller counter (i). Specifically, the initial value corresponds to a first one of the information datasets that is to be processed by the BMC 111. In one example, the initial value is set to be 1 (i.e., (i)=1) to indicate the first one of the information datasets that is to be processed by the BMC 111. It should be noted that the first one of the information datasets that is to be processed by the BMC 111 may be a first one of the information datasets received by the BMC 111, but the disclosure is not limited to such.

In steps 23 to 26, the BMC 111 implements a first management process for an i$^{th}$ one of the information datasets that is to be processed by the BMC 111.

To describe in further detail, in step 23, the BMC 111 determines whether the electronic device 112 that corresponds to the i$^{th}$ one of the information datasets is an FRU based on the header information included in the i$^{th}$ one of the information dataset. In response to determining that the electronic device 112 corresponding to the i$^{th}$ one of the information dataset is an FRU, the flow proceeds to step 24; otherwise, the flow proceeds to step 25.

In this embodiment, the BMC 111 determines whether a zeroth byte of the header information included in the information dataset has a value equal to a predetermined value (e.g., 0x01), and whether a sum of values respectively of all bytes except for a last byte (i.e., zeroth to sixth byte) of the header information included in the information dataset is equal to a value of the last byte (i.e., seventh byte), so as to determine whether the electronic device 112 that corresponds to the information dataset is an FRU. In response to determining that the value of the zeroth byte of the header information included in the information dataset is equal to the predetermined value, and that the sum of the values of all bytes except for the last byte of the header information is equal to the value of the last byte, the BMC 111 determines that the electronic device 112 corresponding to the information dataset is an FRU.

It should be noted that the value of the last byte of the header information included in the information dataset represents a common header checksum, and determining whether the sum of values respectively of all bytes except for the last byte of the header information included in the information dataset is equal to the value of the last byte is to check whether the header information of the information dataset is correct. In some embodiments, the BMC 111 may omit checking on the last byte of the header information and directly determine whether the value of the zeroth byte of the header information is equal to the predetermined value, so as to determine whether the electronic device 112 that corresponds to the information dataset is an FRU. That is to say, in response to determining that the zeroth byte of the header information is equal to the predetermined value, the BMC 111 determines that the electronic device 112 corresponding to the information dataset is an FRU.

In step 24, the BMC 111 generates an identification code that corresponds to the $i^{th}$ one of the information datasets and that conforms to specifications of Intelligent Platform Management Interface (IPMI), and stores the $i^{th}$ one of the information datasets and the identification code corresponding to the $i^{th}$ one of the information datasets in the BMC 111 of the node 11. It should be noted that the identification code generated for the $i^{th}$ one of the information datasets is unique.

In this embodiment, the BMC 111 stores an FRU device table, and the BMC 111 stores the $i^{th}$ one of the information datasets and the identification code that corresponds to the $i^{th}$ one of the information datasets into the FRU device table.

In step 25, the BMC 111 determines whether the $i^{th}$ one of the information datasets is a last one of the information datasets that is to be processed by the BMC 111. For example, the BMC 111 determines whether the $i^{th}$ one of the information datasets is a last one of the information datasets by determining whether the value of the controller counter (i) is equal to a total number of the information datasets. In response to determining that the $i^{th}$ one of the information datasets is not the last one of the information datasets, the flow proceeds to step 26; otherwise, in response to determining that the $i^{th}$ one of the information datasets is the last one of the information datasets, the flow of the first procedure ends.

In step 26, the BMC 111 increases the controller counter (i) by one (i.e., set (i)=(i)+1), and the flow goes back to step 23. That is to say, after increasing the controller counter (i) by one, the BMC 111 repeats the first management process until determining that the $i^{th}$ one of the information datasets is the last one of the information datasets.

Figure 3:
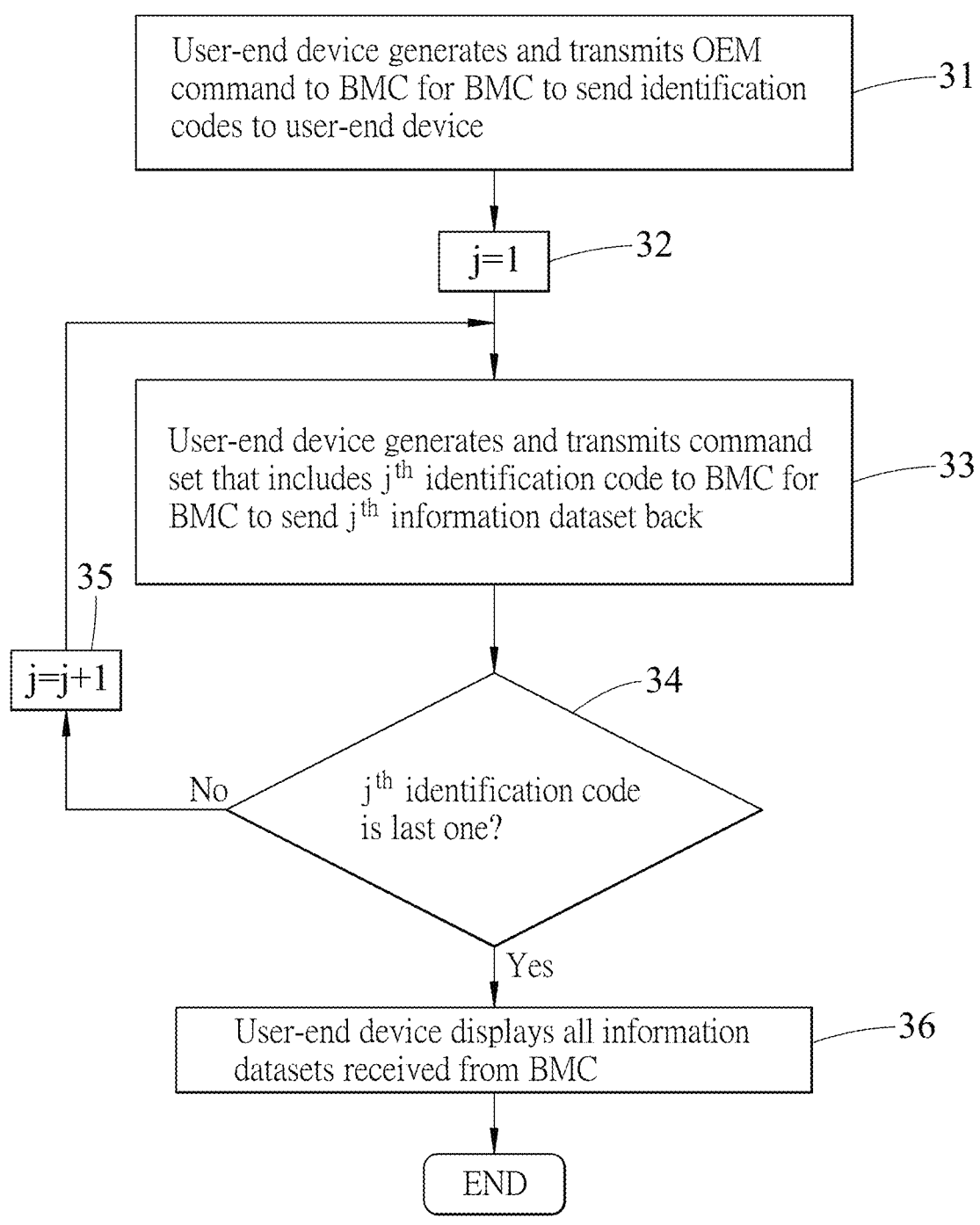
FIG. 3 is a flow chart illustrating a second procedure of the method for managing information of FRUs according to an embodiment of the disclosure.

Referring further to FIG. 3, according to an embodiment of the disclosure, a flow of the second procedure includes steps 31 to 36.

In step 31, the user-end device 100 generates and transmits, through the communication network 101, an Original Equipment Manufacturer (OEM) command to the BMC 111 of each of the nodes 11, where the OEM command is requesting for all identification codes that correspond respectively to the electronic devices 112 of the node 11 determined to be an FRU. In response to receiving the OEM command from the user-end device 100, the BMC 111 of each of the nodes 11 sends the identification codes stored in the BMC 111 to the user-end device 100.

In step 32, the user-end device 100 assigns another initial value to a user-end counter (j). Specifically, the another initial value corresponds to a first one of the identification codes that is to be processed by the user-end device 100 from the BMC 111 of each of the nodes 11. In one example, the another initial value is set to be 1 (i.e., (j)=1) to indicate the first one of the identification codes that is to be processed by the user-end device 100.

In steps 33 to 35, the user-end device 100 implements a second management process for a $j^{th}$ one of the identification codes that is to be processed by the user-end device 100.

To describe in further detail, in step 33, the user-end device 100 generates and transmits, based on the $j^{th}$ one of the identification codes and through the communication network 101, a command set that includes the $j^{th}$ one of the identification codes to the BMC 111 of one of the nodes 11 that sends the $j^{th}$ one of the identification codes to the user-end device 100. In response to receiving the command set, the BMC 111 storing the $j^{th}$ one of the identification codes sends the information dataset that corresponds to the $j^{th}$ one of the identification codes to the user-end device 100.

In step 34, the user-end device 100 determines whether the $j^{th}$ one of the identification codes is a last one of the identification codes that is to be processed by the user-end device 100. In response to determining that the $j^{th}$ one of the identification codes is not the last one of the identification codes, the flow proceeds to step 35; otherwise, in response to determining that the $j^{th}$ one of the identification codes is the last one of the identification codes, the flow proceeds to step 36.

In step 35, the user-end device 100 increases the user-end counter (j) by one (i.e., set (j)=(j)+1), and the flow goes back to step 33. That is to say, after increasing the user-end counter (j) by one, the user-end device 100 repeats the second management process until determining that the $j^{th}$ one of the identification codes is the last one of the identification codes.

In step 36, the user-end device 100 displays all the information datasets received from the BMCs 111 of the nodes 11. That is to say, the information datasets displayed by the user-end device 100 correspond to the FRUs of the host system 1.

In this embodiment, the user-end device 100 uses webpage-based management software to implement the second management process, and in step 36, all the information datasets received by the user-end device 100 are displayed on a screen of the user-end device 100 through a webpage.

In summary, according to the disclosure, the BMC 111 of each of the nodes 11 obtains and stores the information datasets and the identification codes that correspond to those of the electronic devices 112 that are FRUs. As such, the user-end device 100 may obtain the information datasets of the FRUs remotely by sending the command set to the host system 1 through the management software; therefore, it is not required to access a firmware code of an FRU device when the FRU device is added or removed from the host system 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing information of field replaceable units (FRUs) to be implemented by a baseboard management controller (BMC), the BMC being electrically connected to a plurality of electronic devices and being connected to a user-end device through a communication network, the method comprising steps:

A) sending a query to each of the electronic devices requesting information datasets respectively from the electronic devices, where each of the information datasets includes header information;

B) for each of the information datasets received from the electronic devices, determining whether the electronic device that corresponds to the information dataset is an FRU based on the header information included in the information dataset, and in response to determining that the electronic device corresponding to the information dataset is an FRU, generating an identification code that corresponds to the information dataset and that conforms to specifications of Intelligent Platform Management Interface (IPMI), and storing the information dataset and the identification code, wherein the identification code generated for each of the information datasets received from the electronic devices is unique;

C) in response to receiving, from the user-end device, an Original Equipment Manufacturer (OEM) command requesting for all identification codes that correspond respectively to the electronic devices determined to be an FRU, sending the identification codes stored in the BMC to the user-end device; and D) in response to receiving a command set that includes one of the identification codes stored in the BMC, sending the information dataset that corresponds to said one of the identification codes to the user-end device.

2. The method as claimed in claim 1, wherein, in step B), determining whether the electronic device that corresponds to the information dataset is an FRU includes:

determining whether a zeroth byte of the header information included in the information dataset has a value equal to a predetermined value, and in response to determining that the value of the zeroth byte of the header information included in the information dataset is equal to the predetermined value, determining that the electronic device is an FRU.

3. The method as claimed in claim 2, wherein, in step B), determining whether the electronic device that corresponds to the information dataset is an FRU further includes:

determining whether a sum of values respectively of all bytes except for a last byte of the header information included in the information dataset is equal to a value of the last byte; and in response to determining that the value of the zeroth byte of the header information included in the information dataset is equal to the predetermined value, and that the sum of the values of all bytes except for the last byte of the header information is equal to the value of the last byte, determining that the electronic device is an FRU.

4. The method as claimed in claim 1, the BMC storing an FRU device table, wherein, in step B), storing the information dataset and the identification code includes storing the information dataset and the identification code that corresponds to the information dataset into the FRU device table.

5. The method as claimed in claim 1, wherein step B) includes:

assigning an initial value to a controller counter (i), where the initial value corresponds to a first one of the information datasets that is to be processed by the BMC;

for an $i^{th}$ one of the information datasets that is to be processed by the BMC, implementing a management process including determining whether the electronic device that corresponds to the $i^{th}$ one of the information datasets is an FRU, in response to determining that the electronic device corresponding to the $i^{th}$ one of the information datasets is an FRU, generating an identification code that corresponds to the $i^{th}$ one of the information datasets and that conforms to the specifications of IPMI, and storing the $i^{th}$ one of the information datasets and the identification code corresponding to the $i^{th}$ one of the information datasets, determining whether the $i^{th}$ one of the information datasets is a last one of the information datasets that is to be processed by the BMC, and in response to determining that the $i^{th}$ one of the information datasets is not the last one of the information datasets, increasing the controller counter (i) by one, and repeating the management process until it is determined that the $i^{th}$ one of the information datasets is the last one of the information datasets.

6. The method as claimed in claim 1, wherein each of the information datasets further includes address information, wherein step B) further includes, for each of the information datasets received from the electronic devices, confirming whether the electronic device that corresponds to the information dataset is an FRU based on the address information included in the information dataset.

7. A method for managing information of field replaceable units (FRUs) to be implemented by a host system, the host system including a plurality of nodes, each of which includes a baseboard management controller (BMC) and a plurality of electronic devices that are connected to the BMC, the BMC being connected to a user-end device through a communication network, the method comprising steps of, by the BMC of each of the nodes:

A) sending a query to each of the electronic devices of the node requesting information datasets respectively from the electronic devices, where each of the information datasets includes header information;

B) for each of the information datasets received from the electronic devices of the node, determining whether the electronic device that corresponds to the information dataset is an FRU based on the header information included in the information dataset, and in response to determining that the electronic device corresponding to the information dataset is an FRU, generating an identification code that corresponds to the information dataset and that conforms to specifications of Intelligent Platform Management Interface (IPMI), and storing the information dataset and the identification code, wherein the identification code generated for each of the information datasets received from the electronic devices of the node is unique;

C) in response to receiving, from the user-end device, an Original Equipment Manufacturer (OEM) command requesting for all identification codes that correspond respectively to the electronic devices of the node determined to be an FRU, sending the identification codes stored in the BMC of the node to the user-end device; and D) in response to receiving a command set that includes one of the identification codes stored in the BMC of the node, sending the information dataset that corresponds to said one of the identification codes to the user-end device.

8. The method as claimed in claim 7, wherein, in step B), determining, for each of the information datasets received from the electronic devices of the node, whether the electronic device that corresponds to the information dataset is an FRU includes:

determining whether a zeroth byte of the header information included in the information dataset has a value equal to a predetermined value, and in response to determining that the value of the zeroth byte of the header information included in the information dataset is equal to the predetermined value, determining that the electronic device is an FRU.

9. The method as claimed in claim 8, wherein, in step B), determining, for each of the information datasets received from the electronic devices of the node, whether the electronic device that corresponds to the information dataset is an FRU further includes:

determining whether a sum of values respectively of all bytes except for a last byte of the header information included in the information dataset is equal to a value of the last byte, and in response to determining that the value of the zeroth byte of the header information included in the information dataset is equal to the predetermined value, and that the sum of the values of all bytes except for the last byte of the header information is equal to the value of the last byte, determining that the electronic device is an FRU.

10. The method as claimed in claim 7, the BMC of each of the nodes storing an FRU device table, wherein, in step B), storing the information dataset and the identification code includes storing the information dataset and the identification code that corresponds to the information dataset into the FRU device table that is stored in the BMC of the node.

11. The method as claimed in claim 7, wherein step B) includes, by the BMC of each of the nodes:

assigning an initial value to a controller counter (i) that corresponds to the BMC of the node, where the initial value corresponds to a first one of the information datasets that is to be processed by the BMC of the node;

for an $i^{th}$ one of the information datasets that is to be processed by the BMC of the node, implementing a management process including determining, for each of the information datasets received from the electronic devices of the node, whether the electronic device that corresponds to the $i^{th}$ one of the information datasets is an FRU, in response to determining that the electronic device corresponding to the $i^{th}$ one of the information datasets is an FRU, generating an identification code that corresponds to the $i^{th}$ one of the information datasets and that conforms to the specifications of IPMI, and storing the $i^{th}$ one of the information datasets and the identification code corresponding to the $i^{th}$ one of the information datasets, determining whether the $i^{th}$ one of the information datasets is a last one of the information datasets that is to be processed by the BMC of the node; and in response to determining that the $i^{th}$ one of the information datasets is not the last one of the information datasets, increasing the controller counter (i) by one, and repeating the management process until it is determined that the $i^{th}$ one of the information datasets is the last one of the information datasets.

12. The method as claimed in claim 7, wherein each of the information datasets further includes address information, wherein step B) further includes, for each of the information datasets received from the electronic devices of the node, confirming whether the electronic device that corresponds to the information dataset is an FRU based on the address information included in the information dataset.

13. A host system comprising a plurality of nodes, each of which includes:

a baseboard management controller (BMC) configured to be connected to a user-end device through a communication network; and a plurality of electronic devices connected to said BMC;

wherein said BMC of each of said nodes is configured to, send a query to each of said electronic devices of said node requesting information datasets respectively from said electronic devices, where each of the information datasets includes header information, for each of the information datasets received from said electronic devices of said node, determine whether said electronic device that corresponds to the information dataset is an FRU based on the header information included in the information dataset, and in response to determining that said electronic device corresponding to the information dataset is an FRU, generate an identification code that corresponds to the information dataset and that conforms to specifications of Intelligent Platform Management Interface (IPMI), and store the information dataset and the identification code in said BMC of said node, wherein the identification code generated for each of the information datasets received from said electronic devices of said node is unique;

in response to receiving, from the user-end device, an Original Equipment Manufacturer (OEM) command requesting for all identification codes that correspond respectively to said electronic devices of said node determined to be an FRU, send the identification codes stored in said BMC of said node to the user-end device; and in response to receiving a command set that includes one of the identification codes stored in said BMC of said node, send the information dataset that corresponds to said one of the identification codes to the user-end device.

14. The host system as claimed in claim 13, wherein said BMC of each of said nodes is configured to determine, for each of the information datasets received from said electronic devices of said node, whether said electronic device that corresponds to the information dataset is an FRU by:

determining whether a zeroth byte of the header information included in the information dataset has a value equal to a predetermined value, and in response to determining that the value of the zeroth byte of the header information included in the information dataset is equal to the predetermined value, determining that said electronic device is an FRU.

15. The host system as claimed in claim 14, wherein said BMC of each of said nodes is configured to determine, for each of the information datasets received from said electronic devices of said node, whether said electronic device that corresponds to the information dataset is an FRU by:

determining whether a sum of values respectively of all bytes except for a last byte of the header information included in the information dataset is equal to a value of the last byte, and in response to determining that the value of the zeroth byte of the header information included in the information dataset is equal to the predetermined value, and that the sum of the values of all bytes except for the last byte of the header information is equal to the value of the last byte, determining that said electronic device is an FRU.

16. The host system as claimed in claim 13, wherein said BMC of each of said nodes stores an FRU device table, wherein said BMC of each of said nodes is configured to store the information dataset and the identification code by storing the information dataset and the identification code that corresponds to the information dataset into the FRU device table that is stored in said BMC of said node.

17. The host system as claimed in claim 13, wherein said BMC of each of said nodes is configured to:

assign an initial value to a controller counter (i) that corresponds to said BMC of said node, where the initial value corresponds to a first one of the information datasets that is to be processed by said BMC of said node;

for an $i^{th}$ one of the information datasets that is to be processed by the BMC, implement a management process including determining, for each of the information datasets received from said electronic devices of said node, whether said electronic device that corresponds to the $i^{th}$ one of the information datasets is an FRU, in response to determining that said electronic device corresponding to the $i^{th}$ one of the information datasets is an FRU, generating an identification code that corresponds to the $i^{th}$ one of the information datasets and that conforms to the specifications of IPMI, and storing the $i^{th}$ one of the information datasets and the identification code corresponding to the $i^{th}$ one of the information datasets, determining whether the $i^{th}$ one of the information datasets is a last one of the information datasets that is to be processed by said BMC of said node; and in response to determining that the $i^{th}$ one of the information datasets is not the last one of the information datasets, increasing the controller counter (i) by one, and repeating the management process until it is determined that the $i^{th}$ one of the information datasets is the last one of the information datasets.

18. The host system as claimed in claim 13, wherein each of the information datasets further includes address information, wherein said BMC of each of said nodes is configured to, for each of the information datasets received from said electronic devices of said node, confirm whether said electronic device that corresponds to the information dataset is an FRU based on the address information included in the information dataset.

\* \* \* \* \*